H. J. H. NATHORST & G. LUNDSTRÖM.
PROCESS OF FORMING AND SHARPENING DRILL BITS AND THE LIKE.
APPLICATION FILED DEC. 7, 1909.
1,094,807.
Patented Apr. 28, 1914.
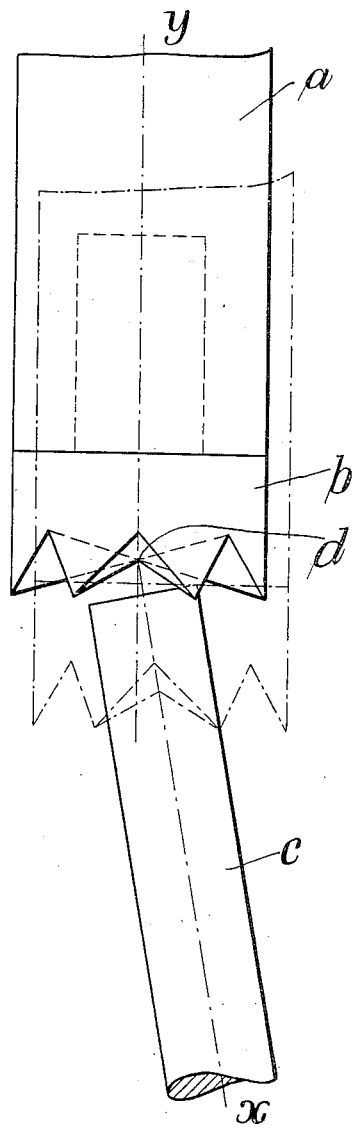
Witnesses.
Inventors.

HARRY JOHAN HJALMAR NATHORST AND GOTTHARD LUNDSTRÖM, OF GELLIVARE MALMFÄLT, MALMBERGET, SWEDEN, ASSIGNORS, BY MESNE ASSIGNMENTS, TO NYA AKTIEBOLAGET ALTAS, OF STOCKHOLM, SWEDEN.

PROCESS OF FORMING AND SHARPENING DRILL-BITS AND THE LIKE.

1,094,807.   Specification of Letters Patent.   Patented Apr. 28, 1914.

Application filed December 7, 1909. Serial No. 531,806.

*To all whom it may concern:*

Be it known that we, HARRY JOHAN HJALMAR NATHORST and GOTTHARD LUNDSTRÖM, subjects of the King of Sweden, residing at Gellivare Malmfält, Malmberget, Sweden, have jointly invented new and useful Improvements in Processes of Forming and Sharpening Drill-Bits and the like, of which the following is a specification, reference being had to the drawing accompanying and forming a part hereof.

This invention relates to an improved process of forming or sharpening cutting edges on drill bits or other similar tools.

In forming or sharpening cutting edges on drill bits and the like, especially cruciform drill bits, so-called star bits, used in rock drills, a machine is usually employed having a stamp which is caused by suitable means to cut into the drill bit. In machines of this kind hitherto used the drill bit was placed in the machine in alinement with the stamp and the latter was thus caused to cut into the drill bit in its longitudinal direction. In these machines it is difficult, on account of the resistance of the hard drill bit, to form the cutting edges in one heating. On account thereof, it has usually been necessary to repeatedly heat and work the bit in the machine. This procedure is time-wasting and disadvantageous in respect to the durability of the drill bit.

The object of this invention is to enable the cutting edges of the bit to be formed or the sharpening to be effected with less labor and in one heating.

The invention consists, chiefly, in forming and sharpening the cutting edges by operating the heated drill bit by a rotary stamp moving at an angle to the drill bit, and turning the stamp and the drill bit during the said operation so as to expose the end of the drill bit all around, or to such an extent as is required for obtaining the desired teeth, to the action of the stamp for cutting and sharpening the drill bit in one heating.

In carrying the invention into effect, the drill bit is suitably placed in a machine in such a position that the axis of the drill bit forms an angle less than 30° with the axis of the stamp. By this means only one of the teeth of the stamp will cut at a time into the drill bit and the whole power of the machine will thus be applied only on a small part of the drill bit at a time, by which the end of the drill bit is more easily split and pressed out. In order to conveniently cut the drill bit all around without reheating, the stamp is rotated about its axis and the drill bit is pressed against the stamp in such a manner as to be able to rotate about its axis, by which the drill bit will be caused to partake in the rotation of the stamp. The rotation of the stamp may be performed by machine power or by hand. Obviously, the same action may be obtained by directly turning the drill bit, while the stamp is rotated by the drill bit bearing thereon.

The invention further comprises the construction and combination of parts hereinafter more particularly described.

The invention is illustrated in the drawing which shows schematically, viewed from above, a machine by which our improved process may be carried into effect.

Referring to the drawing, the machine consists of a pneumatic hammer the fore part $a$ of which is shown in the drawing. Inserted in the said machine is a stamp $b$ adapted to cut into the end of the drill bit $c$ which is rotatably placed in a suitable holder (not shown). The pneumatic hammer and the holder are suitably adjustable relatively to each other in such a manner that the angle of inclination between the axis of the stamp and that of the drill bit may be changed. The stamp $b$ which is inserted in a suitable rotating device in the machine is caused to operate the drill bit by impacts from a reciprocating hammer (not shown). Obviously, the stamp may be connected directly to the hammer, if desired. In the embodiment shown, the stamp is provided with six cutting edges. The drill bit is mounted so that its axis or center line $x$ forms an angle less than 30° with the axis or center line $y$ of the stamp. During the rotation of the stamp about is axis it causes the drill bit to rotate and thereby cuts with one edge after the other into the end of the drill bit so that the whole power of the machine is applied on one edge after the other.

According as the drill bit is operated upon by the stamp it will be necessary, in order that the stamp shall always bear on the drill bit, to cause the hammer and the stamp or the drill bit to be successively fed forward. In each case the relative movement should obviously be such that the center lines will always maintain the same angle of inclination to each other and the center $d$ of the stamp will always be in the center line $x$ of the drill bit. To this end the stamp and its actuating parts may be mounted on a slide moving during the sharpening operation along the center line $x$ of the drill bit, or the latter may for the same purpose be mounted on a slide movable parallel to the center line of the stamp. In the drawing the former arrangement is supposed to be used (the part of the machine carrying the stamp is shown by dotted lines in the position which it will finally take up).

We claim:

The process of forming and sharpening cutting edges on drill bits and the like which consists in heating the drill bit and holding it so that it may rotate, operating upon the same by a stamp moving at an angle to the axis of the drill bit, and rotating one of said parts in contact with the other, thus imparting rotary motion to the latter during the said operation.

HARRY JOHAN HJALMAR NATHORST.
GOTTHARD LUNDSTRÖM.

Witnesses:
ATCO GOLDKUNE,
A. F. DAHNY.

Copies of this patent may be obtained for five cents each, by addressing the "Commissioner of Patents, Washington, D. C."

Correction in Letters Patent No. 1,094,807.

It is hereby certified that the assignee in Letters Patent No. 1,094,807, granted April 28, 1914, upon the application of Harry Johan Hjalmar Nathorst and Gotthard Lundström, of Gellivare Malmfält, Malmberget, Sweden, for an improvement in "Processes of Forming and Sharpening Drill-Bits and the Like," was erroneously described and specified as "Nya Aktiebolaget Altas," whereas it should have been described and specified as *Nya Aktiebolaget Atlas*, as shown by the records of assignments in this office; and that the said Letters Patent should be read with this correction therein that the same may conform to the record of the case in the Patent Office.

Signed and sealed this 7th day of July, A. D., 1914.

[SEAL.]

R. F. WHITEHEAD,
*Acting Commissioner of Patents.*